Sept. 10, 1968 J. J. ECKL 3,401,312

SOLID STATE TIME DELAY AFTER DE-ENERGIZATION FUNCTION CIRCUIT

Filed June 29, 1965

INVENTOR.
JAMES J. ECKL
BY Harold J. Rathbun
& William H. Schmeling

United States Patent Office 3,401,312

Patented Sept. 10, 1968

3,401,312
SOLID STATE TIME DELAY AFTER DE-ENERGIZATION FUNCTION CIRCUIT

James J. Eckl, Milwaukee, Wis., assignor to Square D Company, Park Ridge, Ill., a corporation of Michigan Filed June 29, 1965, Ser. No. 468,044
12 Claims. (Cl. 317—142)

ABSTRACT OF THE DISCLOSURE

A time delay control circuit having solid state components connected to provide a memory and AND logic functions for controlling the energization of a relay and the operation of a timing circuit upon the closure and the opening of a manually operated switch.

Figure 1:
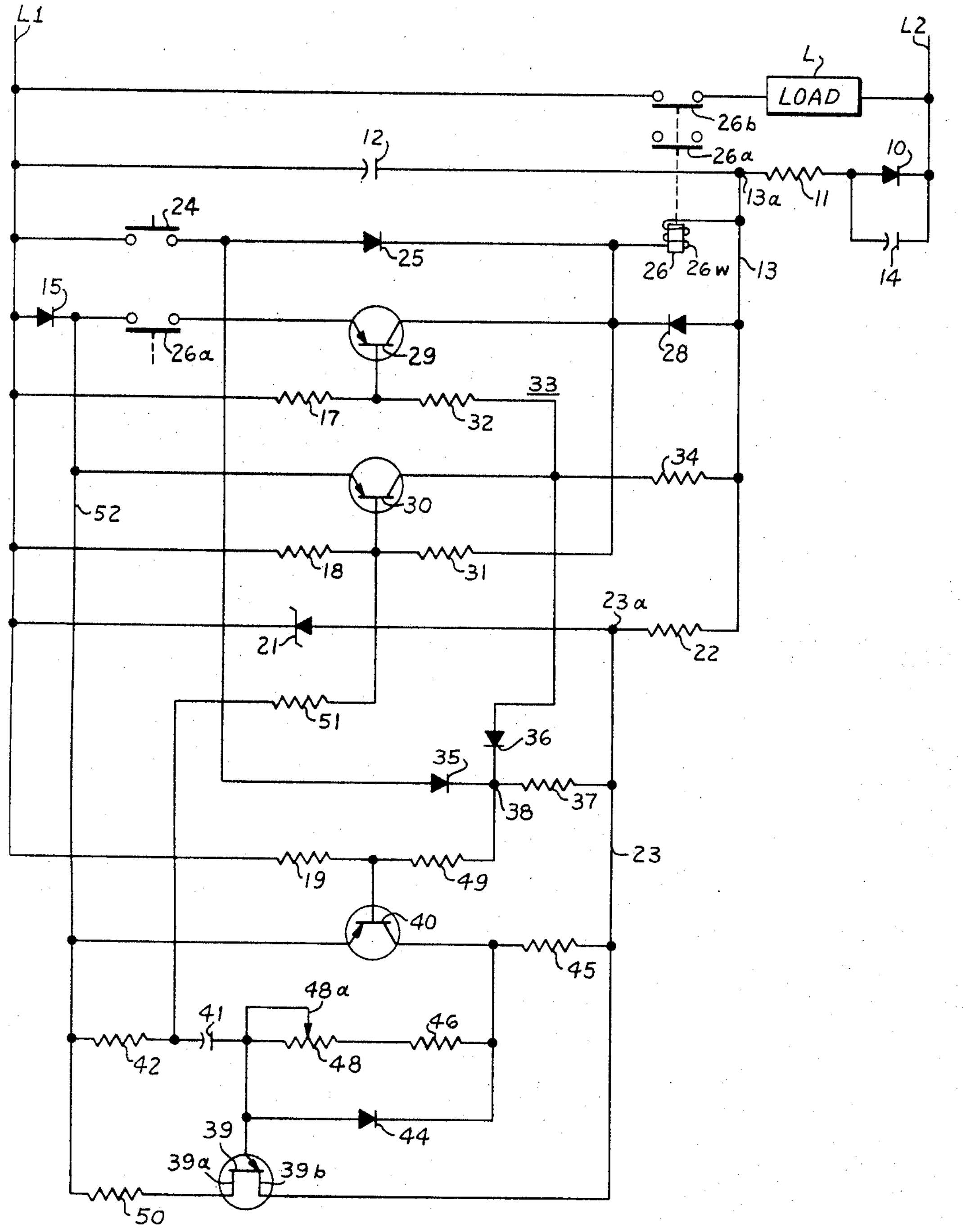

This invention relates to a time delay control circuit, and more particularly, to a resistance-capacitance circuit utilizing transistors for delaying the deenerization of an electromagnetic relay a precise time interval after operation of a manually operated switch.

Prior time delay control circuits in which the discharge period of a capacitor determines the time between initiation of deenergization of the operating winding of a relay and deenergization of the winding and consequent drop-out of the relay have not been satisfactory for applications requiring rapid repetition of the timing cycle because of the time required for charging the capacitor. This disadvantage is obviated in accordance with the present invention by completing a first charging circuit for the capacitor at the expiration of a timing interval and maintaining a second charging circuit completed while the relay winding is deenergized as well as during the time that the relay winding is energized. It is also desirable, in such timing circuits for electromagnetic relays, that the voltage at the relay winding decrease rapidly from an operative value to zero at the expiration of a timing interval. This is accomplished in accordance with the present invention by use of a transistorized bistable memory or multivibrator which changes from one stable state to the other substantially instantaneously. The improved time delay control circuit uses semiconductors and other static components of small size and low heat loss and is capable of adjustment over a wide range.

It is an object of this invention to provide an improved time delay control circuit.

Another object is to provide an improved time delay control circuit which uses only semiconductors and other static components for providing the timing function.

A further object is to provide an improved time delay control circuit which accurately determines the time between initiation of the deenergization of an electromagnetic relay and the drop-out of the relay.

A further object is to provide an improved time delay control circuit including a capacitor which is arranged so that a charging circuit for the capacitor is completed at all times except during the timing interval.

Another object is to provide an improved time delay control circuit in which the deenergization of a relay winding after the expiration of a timing interval results from operation of a bistable memory or multivibrator.

Other objects and advantages of this invention will become apparent in the following description wherein reference is made to the drawing, in which FIG. 1 is an elementary wiring diagram of an embodiment of the invention.

Referring to the drawing, a time delay control circuit in accordance with this invention comprises a power supply section, a relay section, a memory section, an AND section, and a timing section.

The power supply section, which permits the control circuit to be connected directly to an alternating current power source indicated by conductors L1 and L2, provides direct current power at the proper voltage levels for the remaining sections of the circuit. The power supply section comprises a semi-conductor diode 10, a resistor 11, and a filtering capacitor 12 connected in series with each other between the conductors L1 and L2. The diode 10 causes a halfwave rectified voltage to appear across the capacitor 12 between the conductor L1 and a conductor 13 which is connected to a junction **13*a* between the resistor 11 and the capacitor 12. The voltage has a polarity making the conductor 13 negative relative to the conductor L1 and a magnitude as determined by the voltage at the conductors L1 and L2 and the resistance of the resistor 11. A capacitor 14, connected in parallel with the diode 10, provides a low impedance for transient voltages which might otherwise damage the diode 10**.

To provide proper bias voltages for transistors 29 and 30 in the memory and a transistor 40 in the timing section, the power supply section also includes a semiconductor diode 15, a conductor 52 and a plurality of resistors 17, 18 and 19. The diode 15 is poled to cause the conductor 52 to have a negative polarity relative to the conductor L1. To provide the timing section of the control circuit with a stable unidirectional voltage which is independent of the voltage changes between the conductors L1 and L2, the power supply section further includes a Zener diode 21 connected in series with a resistor 22 between the conductors L1 and 13, a conductor 23 being connected to a junction **23*a* between the diode 21 and the resistor 22. The Zener diode is poled to cause the conductor 23** to have a negative polarity relative to the conductor L1.

The relay section comprises a normally open initiating or master switch 24, a semiconductor diode 25, and an electromagnetic relay 26 having an operating winding **26*w* and normally open contacts 26*a* and 26*b*. The contacts 26*a* are shown in operating relationship with the winding 26*w*, as well as at a convenient location in the wiring diagram. The switch 24, the diode 25, and the winding 26*w* are connected in series with each other between the conductors L1 and L3. A semi-conductor diode 28 is connected in parallel with the winding 26*w* to absorb the inductive energy of the winding 26*w*. The diode 25 blocks a positive voltage at the collector of the transistor 29 from reaching the AND section during the interval when the transistor 29 is conducting and the initiating switch 24 is open, as will become apparent. A load L is connected in series with the contacts 26*b* between the conductors L1 and L2 and thus the load is energized when the relay 26 is energized and is deenergized when the relay 26 is deenergized. It is apparent that the relay 26 may have contacts other than the contacts 26*b*** for providing other control functions externally of the time delay control circuit.

The memory section comprises the pair of PNP transistors 29 and 30 having their respective collectors cross-connected with their bases through feedback resistors 31 and 32 to form a bistable multivibrator or memory 33. Bias for the transistor 29 is obtained through the diode 15 and the resistor 17 and for the transistor 30 through the diode 15 and the resistor 18. The relay winding **26*w* constitutes a collector load for the transistor 29, and a resistor 34 which is connected to the conductor 13 provides a collector load for the transistor 30**.

When power is first supplied to the timing circuit from the conductors L1 and L2, the normally open contacts **26*a* of the relay 26 prevent current flow through the transistor 29. Accordingly, the negative potential appearing at the collector of the nonconducting transistor 29 will bias the transistor 30 to conduction and thereby place the memory 33** in a condition designated as its OFF state.

When the memory 33 is in an OFF state, wherein the transistor 30 is conducting and the transistor 29 is nonconducting, the collector of the transistor 30 will be at a potential substantially equal to the potential of the conductor 52 while the collector of the transistor 29 will be at a potential substantially equal to the potential of the conductor 13. When the memory 33 switches to an ON state, the transistor 29 will be conducting while the transistor 30 becomes nonconducting, so the potential at the collectors of the transistors 29 and 30 respectively become substantially equal to the potentials of the conductors 52 and 13. As hereinafter used, a "1" will designate a signal which has a potential substantially equal to the potential of the conductor 13 and a "0" will designate a signal which has a potential substantially equal to the potential of the conductors L1 and 52.

The AND section comprises a pair of semiconductor diodes 35 and 36 and a resistor 37 connected to form a diode AND circuit. The anode of the diode 35 is arranged to be connected to the conductor L1 upon closure of the switch 24 and the cathode of the diode 35 is connected to a junction 38. The diode 36 which is interposed between the collector of the transistor 30 and the junction 38, has an anode connected to the collector of the transistor 30 and a cathode connected to the junction 38. The resistor 37 interconnects the junction 38 with the conductor 23. When the memory 33 is in the OFF state with the transistor 30 conducting, a "0" signal will be transmitted through the diode 36 to the junction 38.

The timing section comprises a unijunction transistor 39, a PNP transistor 40, and a capacitor 41. When the transistor 40 is nonconductive, a main charging circuit for the capacitor 41 is effective and extends from the conductor L1 through the diode 15, the conductor 52, a resistor 42, the capacitor 41, a diode 44 and a collector resistor 45 of the transistor 40 to the conductor 23. The diodes 10, 15 and 44 are poled so that the terminal of the capacitor 41 connected to the resistor 42 becomes positive. When the transistor 40 is conducting, a discharge circuit for the capacitor 41 is completed from the positive side of the capacitor 41 through the resistor 42, the transistor 40 from the emitter to the collector, a resistor 46, and a potentiometer 48 having an adjustable tap **48*a*. The output junction 38 of the AND circuit is connected to the base of the transistor 40 through a resistor 49 forming part of the timing section. The AND circuit is arranged so that when either of the diodes 35 and 36 provide a "0" signal to the junction 38, the transistor 40 will be nonconductive and when both of the diodes 35 and 36 receive a "1" signal at their anodes, the transistor will be conductive. A temperature compensating resistor 50 is interposed between the diode 15 and a base 39*a* of the unijunction transistor 39, the other base 39*b* being connected to the conductor 23. The emitter of the unijunction transistor 39 is connected to the negative side of the capacitor 41, the positive side of capacitor 41 is connected through a resistor 51 to the base of the transistor 30. As will become apparent, an auxiliary charging circuit for the capacitor 41 is completed through the resistor 42 and the transistor 39 upon conduction of the unijunction transistor 39**.

The operation of the improved timing control circuit will now be described in detail. With power available at the conductors L1 and L2 and before closure of the switch 24, the memory 33 is in the OFF state, as previously explained. The output of the AND section at the junction 38 is a "0," preventing conduction of the transistor 40 and thereby permitting the capacitor 41 to accumulate and maintain a charge through the main charging circuit.

Upon closure of the switch 24, the operating winding **26*w* is energized through the rectifier 25, and the relay 26 picks up to close its normally open contacts 26*a* and 26*b*. When the switch 24 and the contacts 26*a* are closed, the diode 25 will supply a "0" signal through the resistor 31 to the base of the transistor 30 which biases the transistor 30 toward nonconduction. As the conduction of the transistor 30 reduces, the signal at its collector becomes "1" which is transmitted to the base of the transistor 29 through the resistor 32. The "1" signal input to the base of the transistor 29 causes the transistor 29 to switch to a conductive state and provide a "0" output signal at its collector while the transistor 30 provides a "1" output signal at its collector so the memory 33 is in a condition designated as an ON state. When the memory 33 is in an ON state and the switch 24 is closed, the diode 35 will supply a "0" signal to the junction 38 which will maintain the transistor 40** nonconductive.

The timing operation begins as soon as the master switch 24 is opened to initiate deenergization of the winding **26*w*. The winding 26*w* remains energized after opening of the switch 24 because the memory 33 is now in the ON state and completes a circuit through the diode 15, the contacts 26*a*, the conducting transistor 29 from the emitter to the collector, and the winding 26*w*. Upon opening of the contacts of the switch 24, the "0" signal at the diode 35 changes from a "0" to a "1" and because the signal at its input through the diode 36 is also a "1," the signal at the output junction 38 of the AND changes from a "0" to a "1." As the junction 38 is connected to the base of the transistor 40, the "1" signal at the junction 38 causes the transistor 40 to switch to a conductive state and the capacitor 41 starts to discharge through the transistor 40, the resistor 46 and the potentiometer 48. Adjustment of the potentiometer 48 by means of the tap 48*a* determines the rate of discharge of the capacitor 41 and thus determines the duration of the timing interval. When the voltage across the capacitor 41 reaches a reduced value such that the emitter-to-base voltage of the unijunction transistor 39 exceeds the product of the intrinsic stand-off ratio of the unijunction transistor 39 and the base 39*a* to base 39*b* voltage, the unijunction transistor 39 conducts. When the unijunction transistor 39 conducts, the capacitor 41 charges through the auxiliary charging circuit including the resistor 42, the capacitor 41 and the emitter and base 39*b* of the unijunction transistor 39. The charging of the capacitor 41 through the auxiliary charging circuit causes a momentary voltage pulse to appear across the resistor 42 providing a momentary "1" signal at the capacitor 41 side of the resistor 42. This momentary "1" voltage pulse, which is supplied through the resistor 51 to the base of the transistor 30, causes the transistor 30 to switch to a conductive state and the memory 33 to switch to its OFF state. The switching of the memory 33 to its OFF state after the unijunction transistor 39 is switched to a conductive state occurs in microseconds and causes the winding 26*w* to be deenergized. The relay 26 thereupon opens its contacts 26*a* and 26*b*. Opening of the contacts 26*a* maintains the memory 33 in the OFF state, and opening of the contacts 26*b* disconnects the load L from the conductors L1 and L2**.

As soon as the memory 33 is switched to its OFF state, a "0" signal will be transmitted by the diode 36 to the output junction 38. Thus the output of the AND circuit will change from a "1" to a "0" and the transistor 40 will cease conduction, whereupon the main charging circuit for the capacitor 41 becomes effective. The charge on the capacitor 41 which was accumulated during conduction of the unijunction transistor 39 is thus maintained and is increased if the pulse through the unijunction transistor 39 was insufficient to cause the capacitor 41 to become fully charged prior to the initiation of the next timing period.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A time delay control circuit for delaying the deenergization of an electrical device for a predetermined time interval after operation of a master switch, said time delay control circuit comprising a main and an auxiliary energizing circuit for the device, a master switch having closed and open conditions and operative to complete the main energizing circuit when in said closed condition and to interrupt the main energizing circuit when in said open condition, a bistable memory operative to complete the auxiliary energizing circuit when in one state and operative to interrupt the auxiliary circuit when in the other state, means causing the memory to be in said other state when the master switch is initially in said open condition and to transfer to said one state upon said master switch changing from said open to said closed condition, and time delay means responsive to the master switch changing from said closed to said open condition to transfer the memory from said one to said other state after a time delay.

2. A time delay control circuit in accordance with claim 1 characterized in that the master switch includes a set of contacts for opening and closing the main energizing circuit.

3. A time delay control circuit in accordance with claim 1 characterized in that the memory comprises a pair of transistors.

4. A time delay control circuit for delaying the deenergization of an operating winding of an electromagnetic relay for a predetermined time interval after operation of a master switch, said time delay control circuit comprising an electromagnetic relay having an operating winding, a main and an auxiliary energizing circuit for the winding, a master switch having closed and open conditions and operative to complete the main energizing circuit when in said closed condition and to interrupt the main energizing circuit when in said open condition, a bistable memory operative to complete the auxiliary energizing circuit when in one state and operative to interrupt the auxiliary circuit when in the other state, control means causing the memory to be in said other state when the master switch is initially in said open condition and to transfer to said one state upon said master switch changing from said open to said closed condition, and time delay means responsive to the master switch changing from said closed to said open condition to transfer the memory from said one to said other state after a time delay.

5. A time delay control circuit in accordance with claim 4 characterized in that the control means includes a normally open contact of the relay.

6. A time delay control circuit for delaying the deenergization of an operating winding of an electromagnetic relay for a predetermined time interval after operation of a master switch, said time delay control circuit comprising an electromagnetic relay having an operating winding, a main and an auxiliary energizing circuit for the wining, a master switch having closed and open conditions and operative to complete the main energizing circuit when in said closed condition and to interrupt the main energizing circuit when in said open condition, a bistable memory operative to complete the auxiliary energizing circuit when in one state and operative to interrupt the auxiliary circuit when in the other state, control means causing the memory to be in said other state when the master switch is initially in its open condition, a capacitor, a charging circuit operative to charge and to maintain the capacitor charged, a discharge circuit operative to discharge the capacitor, logic means responsive to the state of said memory and the condition of said master switch to render said charging and discharging circuits operative, selectively, the logic means being operative to render said charging circuit operative when the master switch is in said open condition and the memory is in said other state, the control means being operative upon the master switch changing from said open to said closed condition to change the memory from said other state to said one state, said logic means being operative upon the master switch changing from said closed to said open condition with the memory in said one state to render said discharge circuit operative, and means responsive to a predetermined low voltage across said capacitor during discharge thereof to change said memory from said one state to said other state, whereby said auxiliary circuit is rendered incomplete and said winding is deenergized after a time delay.

7. A time delay control circuit for delaying the deenergization of an operating winding of an electromagnetic relay for a predetermined time interval after operation of a master switch, said time delay control circuit comprising an electromagnetic relay having an operating winding, a main and an auxiliary energizing circuit for the winding, a master switch having closed and open conditions and operative to complete the main energizing circuit when in said closed condition and to interrupt the main energizing circuit when in said open condition, a bistable memory operative to complete the auxiliary energizing circuit when in one state and operative to interrupt the auxiliary circuit when in the other state, control means causing the memory to be in said other state when the master switch is initially in said open condition, a transistor, an AND operative in response to the state of the memory and the condition of the master switch to control the conductivity of the transistor and normally maintaining the transistor non-conductive, a capacitor, a charging circuit operative to charge the capacitor when the transistor is non-conductive, a discharge circuit operative to discharge the capacitor at a predetermined rate when the transistor is conductive, control means operative upon the master switch changing from said open to said closed condition to cause the memory to change from said other state to said one state, said AND being operative upon the master switch changing from said closed to said open condition with the memory in said one state to render said transistor conductive thereby to render said discharge circuit operative, and means responsive to a predetermined low voltage across the capacitor during discharge thereof to cause the memory to change from said one state to said other state, whereby the auxiliary circuit is rendered incomplete and the winding is deenergized a predetermined time after the master switch changes from said closed to said open condition.

8. A time delay control circuit in accordance with claim 7 characterized in that said AND comprises a pair of diodes.

9. A time delay control circuit in accordance with claim 7 characterized in that said means responsive to said predetermined low voltage across the capacitor comprises a unijunction transistor.

10. A time delay control circuit for delaying the deenergization of an operating winding of an electromagnetic relay for a predetermined time interval after operation of a master switch, said time delay control circuit comprising an electromagnetic relay having an operating winding, a main and an auxiliary energizing circuit for said winding, a master switch having closed and open conditions and operative to complete the main energizing circuit when in said closed condition and to interrupt the main energizing circuit when in said open condition, a bistable memory operative to complete the auxiliary energizing circuit when in one state and operative to interrupt the auxiliary circuit when in the other state, control means causing the memory to be in said other state when the master switch is initially in said open condition and to change to said one state upon the master switch changing from said open to said closed condition, a capacitor, a normally-effective charging circuit for the capacitor, a normally-ineffective discharge circuit for the capacitor, means operative to maintain said charging circuit effective when the master switch is in said open condition and the memory is in said other state and when the master switch is in said closed condition and the memory is in said one state, said means being operative upon the master switch changing from said closed to said open condition with the memory in its said one state to render the charging circuit ineffective and the discharge circuit effective, and means responsive to a predetermined low voltage across said capacitor during discharge thereof to change the memory from said one state to said other state, whereby the auxiliary circuit is rendered incomplete and the winding is deenergized after a time delay.

11. A time delay control circuit in accordance with claim 10 characterized in that the means responsive to the predetermined low voltage across the capacitor comprises a unijunction transistor, a resistor, a circuit connecting the capacitor, the unijunction transistor, and the resistor in series with each other, the unijunction resistor being normally nonconductive and becoming conductive upon the capacitor reaching said predetermined low voltage to cause a pulse of voltage to appear across the resistor, and means connecting the resistor to the memory for causing said voltage pulse to change the memory from said one state to said other state.

12. A time delay control circuit for delaying the deenergization of an operating winding of an electromagnetic relay for a predetermined time interval after operation of a master switch, said time delay control circuit comprising an electromagnetic relay having an operating winding, a main and an auxiliary energizing circuit for said winding, a master switch having closed and open conditions and operative to complete the main energizing circuit when in said closed condition and to interrupt the main energizing circuit when in said open condition, a bistable memory operative to complete the auxiliary energizing circuit when in one state and operative to interrupt the auxiliary circuit when in the other state, control means causing the memory to be in said other state when the master switch is initially in said open condition and to change to said one state upon the master switch changing from said open to said closed condition, a capacitor, a normally-effective charging circuit for the capacitor, a normally-ineffective discharge circuit for the capacitor, means operative to maintain said charging circuit effective when the master switch is in said open condition and the memory is in said other state and when the master switch is in said closed condition and the memory is in said one state, said means being operative upon the master switch changing from said closed to said open condition with the memory in its said one state to render the charging circuit ineffective and the discharge circuit effective, and means responsive to a predetermined low voltage across said capacitor during discharge thereof providing an auxiliary charging circuit for the capacitor and a signal for changing the memory from said one state to said other state, whereby the auxiliary circuit is rendered incomplete and the winding is deenergized after a time delay

References Cited

UNITED STATES PATENTS

| | | | |
|---|---|---|---|
| 2,938,152 | 5/1960 | Hachemeister | 317—142 |
| 3,034,024 | 5/1962 | Mierendorf et al. | 317—148.5 |
| 3,163,803 | 12/1964 | Luckadoo | 317 |
| 3,286,135 | 11/1966 | Haver et al. | 317—142 |
| 3,287,608 | 11/1966 | Pokrant | 317—142 |

LEE T. HIX, *Primary Examiner.*

R. V. LUPO, *Assistant Examiner.*